United States Patent [19]

Watabe et al.

[11] Patent Number: 5,053,811

[45] Date of Patent: Oct. 1, 1991

[54] MAGAZINE FOR ADMITTING PHOTOSENSITIVE MATERIALS FOR PHOTOGRAPHIC PRINTER

[75] Inventors: Nobuyuki Watabe; Yoshihiro Nishiyama, both of Kanagawa, Japan

[73] Assignee: Fuji Photo Film Co., Ltd., Minami-ashigara, Japan

[21] Appl. No.: 89,057

[22] Filed: Aug. 25, 1987

Related U.S. Application Data

[63] Continuation of Ser. No. 842,220, Mar. 21, 1986.

[30] Foreign Application Priority Data

Mar. 25, 1985 [JP] Japan .................................. 60-58114

[51] Int. Cl.⁵ .............................................. G03B 27/58
[52] U.S. Cl. ........................................ 355/72; 206/397
[58] Field of Search ............................ 355/72; 206/397

[56] References Cited

U.S. PATENT DOCUMENTS

| 2,327,156 | 8/1943 | Scott | 206/397 |
| 3,086,309 | 4/1963 | Katz | 206/397 |
| 3,698,548 | 10/1972 | Stenzel et al. | |
| 3,843,071 | 10/1974 | Graham | 206/397 |
| 4,431,139 | 2/1984 | Barnsbee et al. | |
| 4,444,313 | 4/1984 | Tyson | 206/397 |
| 4,511,037 | 4/1985 | Lucous | 206/397 |

FOREIGN PATENT DOCUMENTS

| 1586896 | 8/1970 | Fed. Rep. of Germany . | |
| 2503400 | 8/1982 | France . | |
| 408699 | 7/1979 | Sweden | 206/397 |

Primary Examiner—Monroe H. Hayes
Attorney, Agent, or Firm—Burns, Doane, Swecker & Mathis

[57] ABSTRACT

A magazine for admitting a roll of photosensitive material for photographic printer in a drawable state which comprises, a lightproof box made of paper, a cylindrical member made of paper which is provided in said box and which rotatably supports said roll of photosensitive material, and a support member made of paper which supports said cylindrical member.

This magazine is a drawaway type, and it can be manufactured easily and inexpensively. It is easy to use, and there is no problem in its waste treatment.

5 Claims, 4 Drawing Sheets

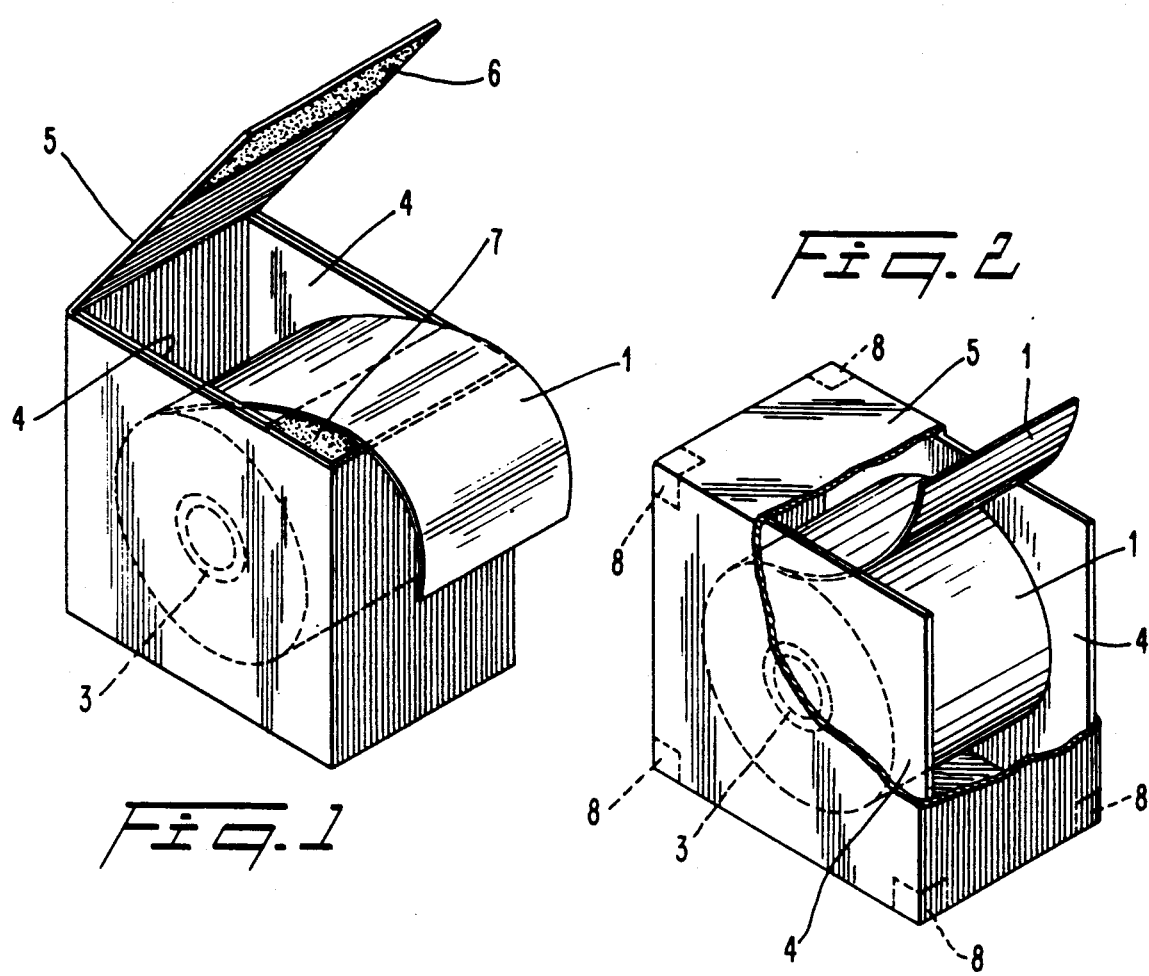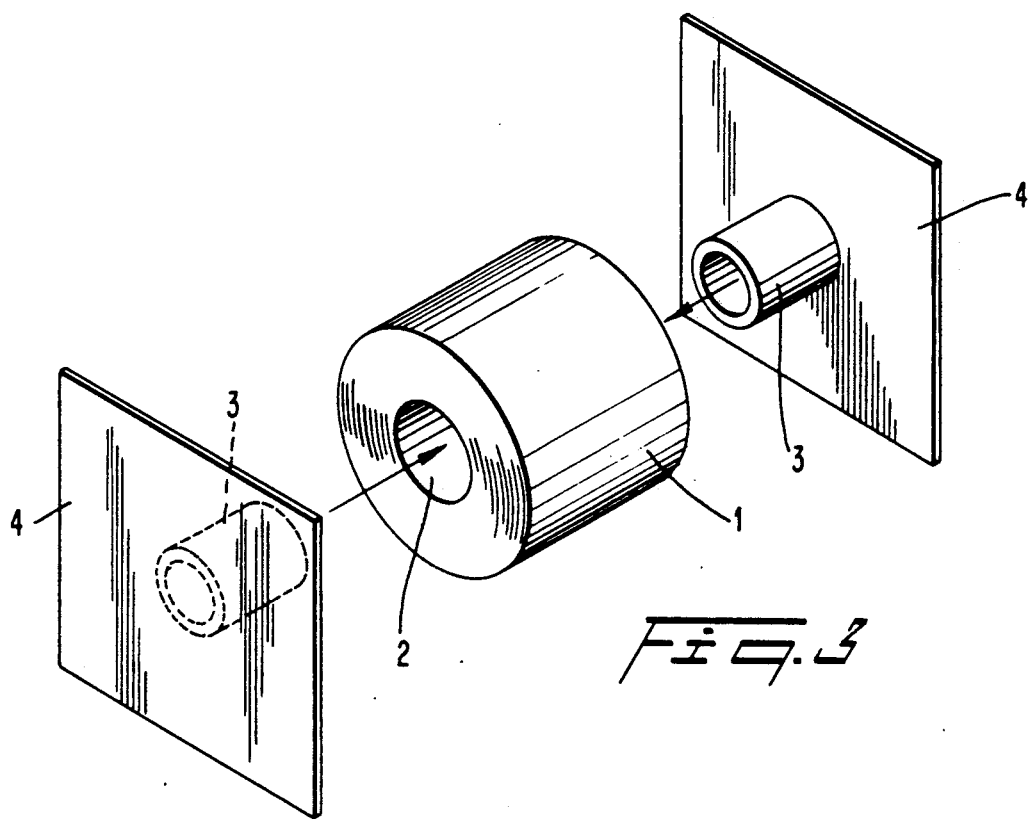

MAGAZINE FOR ADMITTING PHOTOSENSITIVE MATERIALS FOR PHOTOGRAPHIC PRINTER

This application is a continuation of application Ser. No. 842,220, filed Mar. 21, 1986.

BACKGROUND OF THE INVENTION

1. Field of the invention

This invention relates to a photographic magazine for admitting photosensitive materials which is employed for supplying the photosensitive materials to a printer.

2. Description of prior arts

The photosensitive material is usually admitted in a lightproof box having a slit equipped with a light-shielding mechanism. The end of the photosensitive material is drawn out from the slit, and attached to a printer under light circumstances. The following two forms of such magazines are commercially utilized.

(1) The form of using the magazine attached to a printer ( reusable type magazine). The user puts the photosensitive material in the magazine in a dark room, and loads it in the printer.

(2) The form of a throwaway type magazine. The maker puts the photosensitive material in the magazine, and then forwards it. The user merely loads it in the printer in a light room.

The reusable type magazine is expensive, and the putting operation of the photosensitive material is troublesome for the user.

As the throwaway type, the magazine illustrated in FIG. 8 is known (French Patent No. 2,503,400). This magazine comprises a separable plastic box 22 consisting of two halfboxes 21,21. Bearings 26,26 are formed at the centers of right and left joining edges, and both open ends of the core 23 of a rolled photographic paper 24 are rotatably supported through disks 27 having a frange and a short rod 25 by engaging the rod 25 with the bearing 26.

Since this throwaway type magazine is made of a plastic resin, and since its structure is complicated, the manufacturing cost of this magazine is expensive. Accordingly, utility value of this magazine is low. In addition, its waste treatment is also a problem, because it is made of a plastic.

SUMMARY OF THE INVENTION

It is an object of the invention to provide a novel throwaway type magazine for admitting a roll of photosensitive material capable of attaching to a printer in light circumstances.

It is another object of the invention to provide a throwaway type magazine for admitting a roll of photosensitive material having a high practical value.

It is a further object of the invention to provide a throwaway type magazine for admitting a roll of photosensitive material which is inexpensive and of which waste treatment is easy.

BRIEF DESCRIPTION OF THE DRAWINGS

FIG. 1 is a perspective view of a preferred embodiment of the invention.

FIG. 2 is a partially cutaway view thereof.

FIG. 3 is an exploded view in perspective of the cylindrical members fixed on the support members.

DETAILED DESCRIPTION OF THE INVENTION

Figure 4:
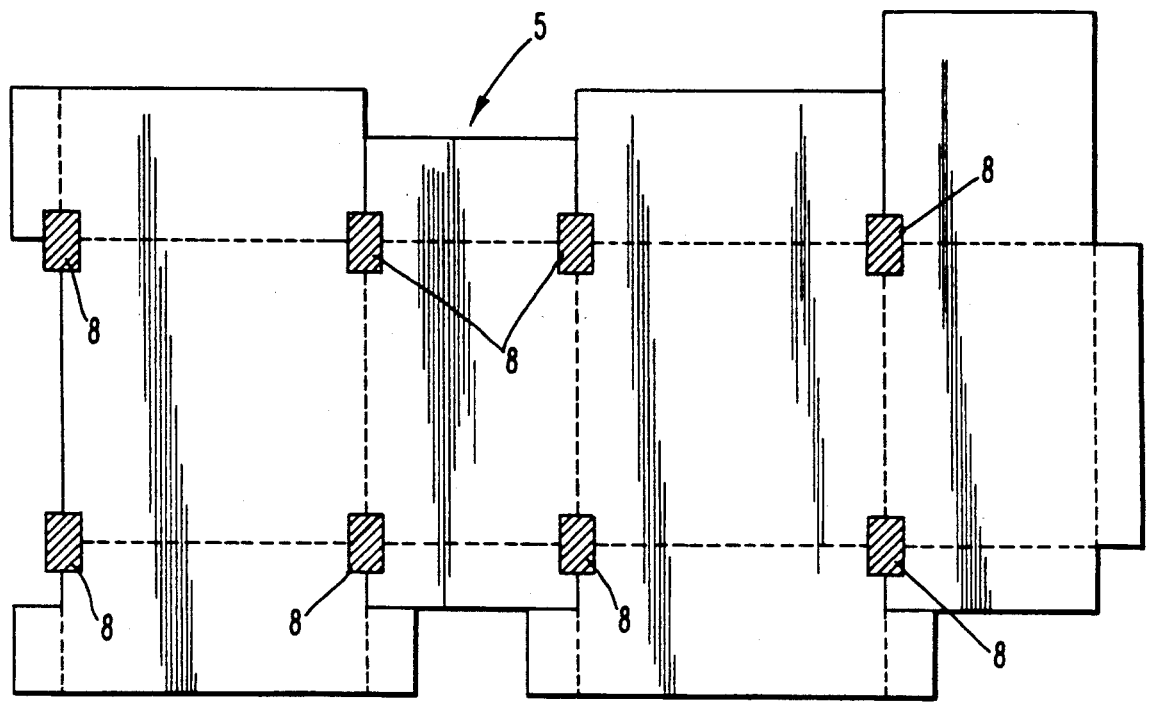
FIG. 4 is a development of the lightproof box.

The magazine of the invention is substantially constructed by paper, and comprises a lightproof box, a cylindrical member and a support member.

The lightproof box shields the roll of photo-sensitive material from outer light, and the box allows the attachment of the roll to a printer under light circumstances. The kind and thickness of the paper constructing the box are determined by considering its light-shielding property and its physical strength. This light-shielding box may be constructed by one sheet of paper. Besides, the box body and its lid may separately be constructed, and then joined.

Since light is liable to enter into the box through its corners, a light-shielding member is preferably attached to each corner. A light-shielding sheet freely bendable is preferable for the light-shielding member in terms of cost and attachment. Such a light-shielding sheet includes a black paper and a black polyester sheet.

The cylindrical member is interposed in the center hole of a roll of photosensitive material with play, and it rotatably supports the roll at a prescribed position of the lightproof box. The paper tube as the cylindrical member is rather hard in order to support the roll and rotate it smoothly. Such a cylindrical member may be one piece or separated according to its support mechanism. Both ends of the cylindrical member are supported by the support member.

The support member comprises a pair of square paper boards, and it is made self-standable by the assistance of the above cylindrical member or other member(s) connecting them. Such as a paper tube may also be employed for engaging the cylindrical member as an auxiliary member of the support member. The cylindrical member is fixed by the support member, and the support member is not secured to the lightproof box.

In the case of the magazine of the invention, light-shielding is secured by the lightproof box, and support of a roll of photosensitive material is born by the cylindrical member and the support member which are separated from the lightproof box. By employing such structure, the magazine for admitting a roll of photosensitive material can inexpensively be supplied and it can be made throwaway. The maker puts the photosensitive material in the magazine, and the user merely loads it in the printer in a, light room. After the whole photosensitive material is used, the remaining magazine can be dumped together with other wastes. The construction of this magazine is easy, and a special equipment such as ultrasonic machine is not necessary. Since this magazine is made of paper, its waste treatment is easy.

EXAMPLE

An example of the magazine of the invention is illustrated in FIGS. 1 to 5.

In FIGS. 1 to 3, 1 indicates a roll of photosensitive material, and a cylindrical member 3 is inserted in the center hole 2 of the photosensitive material 1 with play so as to rotate it 1. The cylindrical member consists of two paper tube 3 having the same size, and the length of each paper tube 3 is slightly longer than a half length of the center hole 2. As the support member, a pair of square corrugated fibreboard 4 is employed, and each paper tube 3 is perpendicularly fixed by using an adhesive on the same position of the corrugated fibreboard 4 so as to be opposed to each into the center hole 2 of the photosensitive material 1 as illustrated in FIG. 3, and they support the photosensitive material 1 supported by such cylindrical member 3 and support member 4 is placed in the lightproof box 5.

Figure 5:
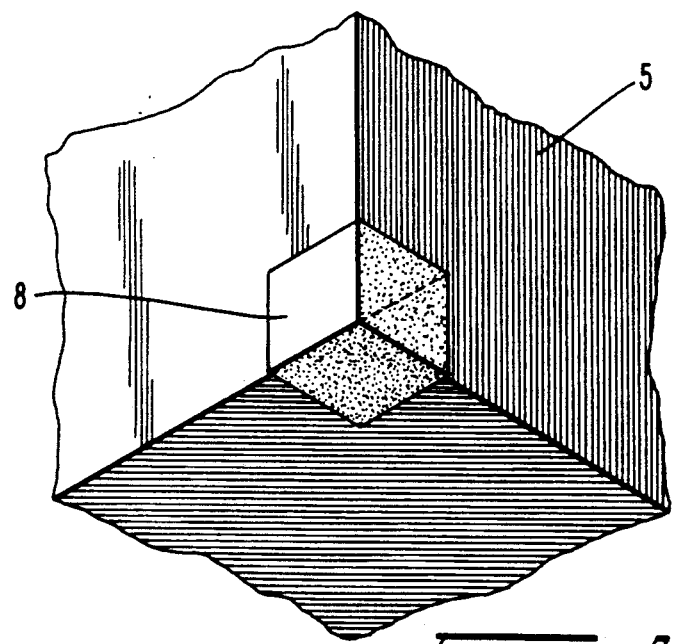
FIG. 5 is a partially perspective view of a corner of the lightproof box.

The lightproof box 5 is made of one sheet of paper, as shown in FIG. 4, and each flap is stuck with paste. A black paper piece 8 is provided at every corner, and it becomes the form as shown in FIG. 5. The structure of the slit for drawing out the photosensitive material 1 is shown in FIG. 1. As illustrated in the drawing, a pair of light-shielding cloths 6,7 is attached to the upper and lower sides of the slit, and the photosensitive material 1 is drawn out by passing through the space between the light-shielding cloths 6,7.

Figure 6:
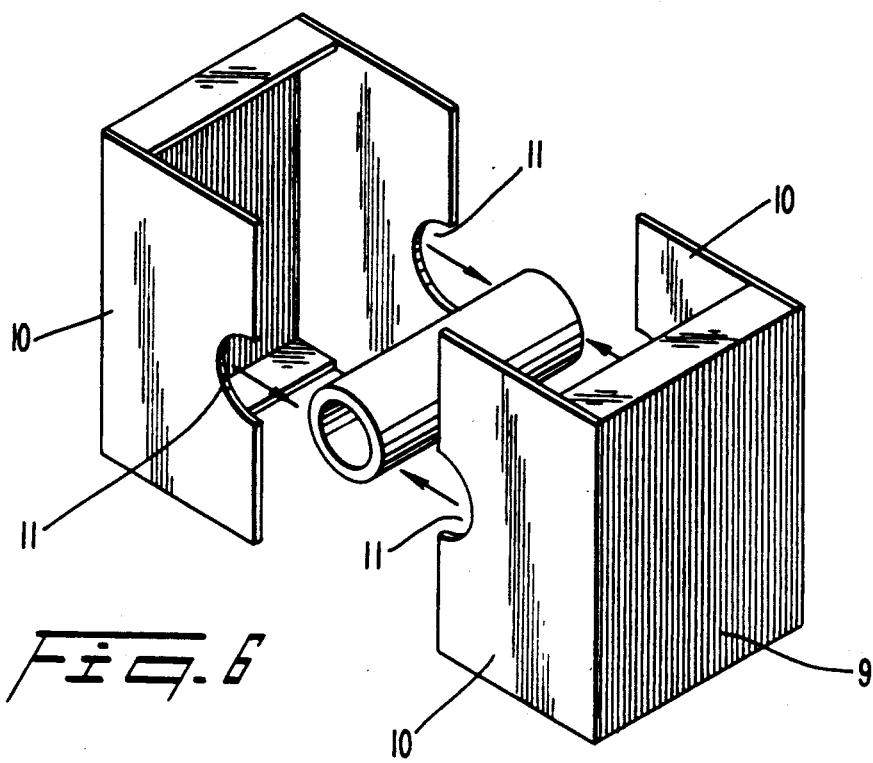
FIG. 6 is an exploded perspective view indicating another support mechanism of a roll of photosensitive material.

Another example of the cylindrical member and the support member is illustrated in FIG. 6. The support member consists of a pair of channel members 9. A semicircular recess 11 of which diameter is almost the same as the cylindrical member is formed at the side edge of each side panel 10 of the channel member 9. The cylindrical member is separated from the support member, and its length is almost the same as the distance between two side panels 10, 10. When the channel members 9,9 are placed in the lightproof box, both ends of the cylindrical member which is inserted through the center hole of the photosensitive material are grasped by the above recesses 11. There is play between the hole and the cylindrical member, and the photosensiteve material is rotatable.

Figure 7:
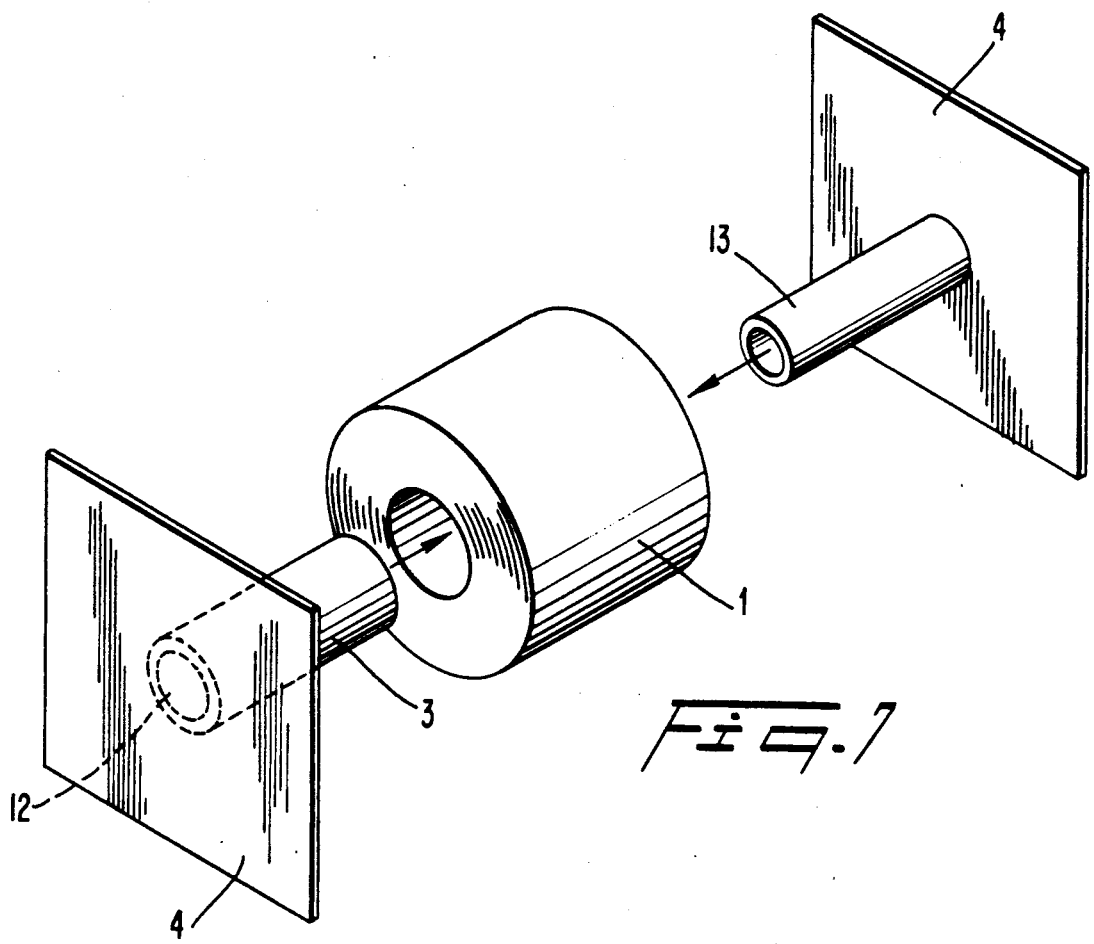
FIG. 7 is also an exploded perspective view indicating a further support mechanism thereof.
Figure 8:
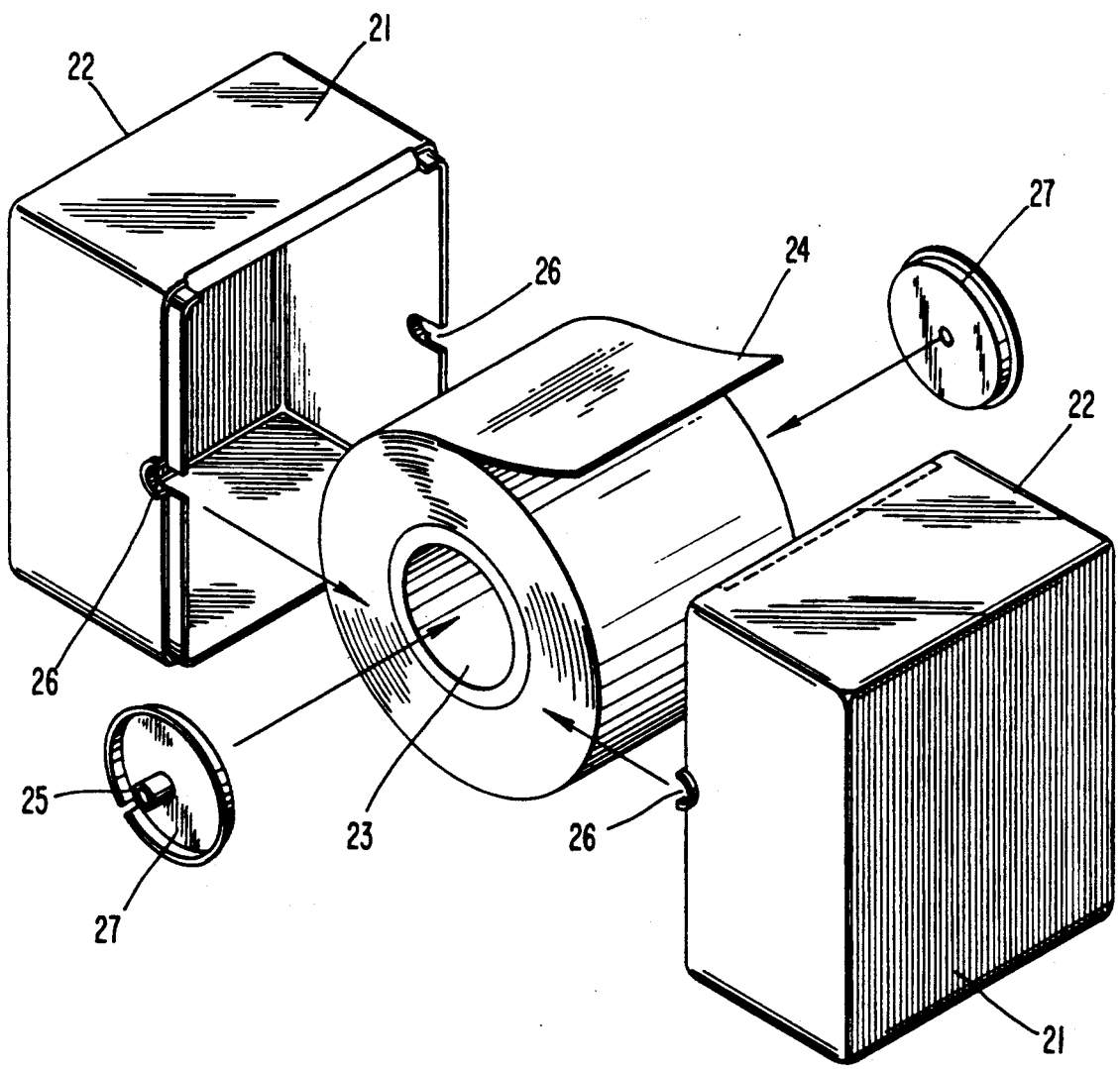
FIG. 8 is an exploded perspective view of a known magazine for admitting a roll of photosensitive material.

A further example of the cylindrical member and the support member is illustrated in FIG. 7. The support member consists of a pair of square paper boards 4,4 and an inner cylinder 13 perpendicularly fixed on one of the paper boards 4,4. The inner cylinder 13 is inserted into the hole 12 of the cylindrical member 3, and support it. The cylindrical member 3 is perpendicularly fixed on the other square paper board 4, and rotatably supports the roll of the photosensitive material 1.

We claim:

1. A magazine for admitting a roll of photosensitive material for a photographic printer in a drawable state comprising a light-proof box made of paper, a cylindrical member made of paper which is provided in said box and which rotatably supports said roll of photosensitive material, and a support member integral with said box and made of paper which supports said cylindrical member, said support member including a pair of substantially square paper boards, the length of said cylindrical member being slightly longer than the width of said roll, said cylindrical member being divided into two cylindrical pieces, each piece of said two cylindrical pieces being perpendicularly fixed on said paper support member and secured by adhesive at a position corresponding to each other, said two cylindrical pieces being received in a center hole of said roll so as to contact each other and define a selfsupporting cylindrical member.

2. The magazine of claim 1 wherein, said support member comprises a pair of square paper boards and an inner cylinder perpendicularly fixed on one of said paper boards which is inserted into said cylindrical member, and the said cylindrical member is perpendicularly fixed on the other paper board of said support member.

3. The magazine of claim 1 or 2, wherein a light-shielding member is attached to each corner of said light-proof box.

4. The magazine of claim 1 or 2, wherein said light-proof box is constructed by one sheet of paper board.

5. The magazine of claim 3, wherein said light-proof box is constructed by one sheet of paper board.

* * * * *